C. J. WILEY.
Printing Telegraph.

No. 168,949. Patented Oct. 19, 1875.

Witnesses
Chas. H. Smith
Harold Serrell

Inventor
Charles J. Wiley
per Lemuel W. Serrell
Atty.

UNITED STATES PATENT OFFICE.

CHARLES J. WILEY, OF NEW YORK, N. Y.

IMPROVEMENT IN PRINTING-TELEGRAPHS.

Specification forming part of Letters Patent No. 168,949, dated October 19, 1875; application filed April 6, 1875.

*To all whom it may concern:*

Be it known that I, CHARLES J. WILEY, of the city and State of New York, have invented an Improvement in Printing-Telegraphs, of which the following is a specification:

Printing-telegraphs have been made with two type-wheels on one shaft, and a variety of devices have been employed for printing from one and not from the other, and changing from one to the other. Among these there have been two type-wheels loose upon a shaft, and the one to be printed from is sustained concentric to the shaft by a hollow conical sleeve, while the other is loose.

My invention relates to two type-wheels entirely independent of each other, and sustained upon arms or levers, one of which levers is pressed down toward the paper, so that the type-wheel is printed from, while the other is raised by a spring out of the way. The type-wheels are revolved by a step-by-step movement, and at certain points one type-wheel is thrown out of action, and the other brought into action, by the movement of the impression-lever.

Figure 1:
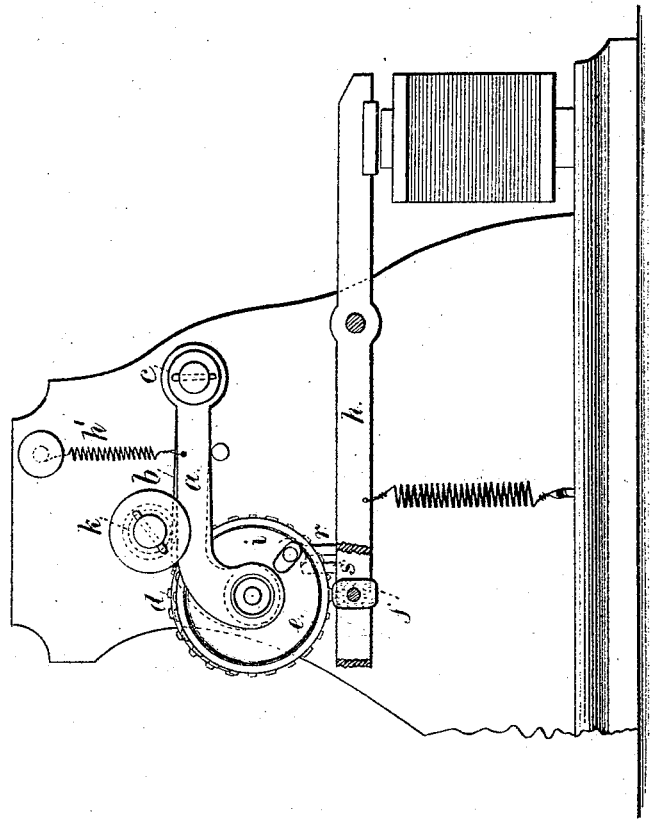
Figure 2:
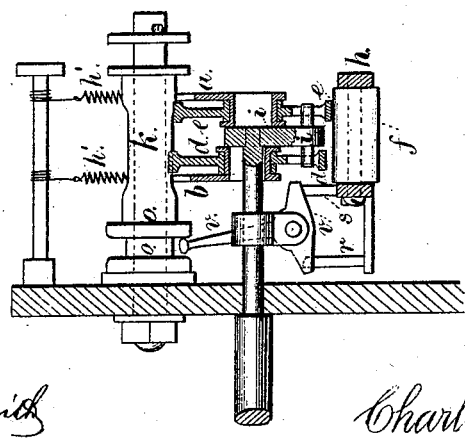

In the drawing, Figure 1 is a side view, and Fig. 2 is a cross-section through the type-wheels.

The levers $a$ $b$ are pivoted at $c$, and at their outer ends the type-wheels $d$ and $e$ are connected with the respective levers by circular bearings or sleeves, so that the type-wheels are independent of each other; but each type-wheel is connected to its own lever, and free to be revolved thereon. The type-wheels, however, are revolved in unison.

I have shown an arm, $i$, with crank-pins at opposite sides passing into slots in the type-wheels, and revolving them; but the type-wheels may be revolved in any desired manner, such as by a gear-wheel taking teeth on two gear-wheels, one attached to each type-wheel, so as to insure uniformity of revolution, but allow one to be raised up, and the other type-wheel to be held down in position for the impression-pad $f$ of the printing-lever $h$ to act against.

The springs $h'$ are sufficient to sustain the respective levers and type-wheels, and $k$ is a sliding cam-shaped bar that is above the levers, and when moved one way one type-wheel is depressed and the other liberated to be raised by the spring, and the positions are reversed by a reverse movement of the sliding cam $k$. In order to move this sliding cam $k$ a T-shaped lever, $v$, is connected with the type-wheels, or the shaft giving motion to the same, and its outer end passes each revolution in between guide-flanges $o$ upon the cam $k$, and upon the printing-lever $h$ there are two pins, $r$ and $s$, that are so placed that the pin $r$ rises into contact with one of the horizontal arms of the T-lever, and, by the vertical portion of the lever $v$, shifts the cam $k$ in one direction, and when the type-wheels are turned another step the lever $v$ comes into position over the pin $s$, so that the cam-slide will be shifted the other way if the printing-lever is actuated at that point.

The levers $a$ $b$ might be extended on the opposite sides of their pivots, and weighted to dispense with the springs; and the cam $k$, instead of being moved endwise, might receive a partial rotation to depress one lever, and allow the other to be raised, and vice versa.

I claim as my invention—

1. The type-wheel $d$, connected to and revolving upon a circular bearing upon the lever $b$, and the second type-wheel $e$, similarly connected to the lever $a$, in combination with the shifting-cam $k$, that acts upon the levers, and the means for raising the type-wheel that is not in action off the paper, as set forth.

2. The two type-wheels independent of the shaft by which they receive a step-by-step movement, and sustained by levers, in combination with the mechanism for printing and for moving the levers by the motion of the printing-lever, substantially as set forth.

Signed by me this 2d day of April, A. D. 1875.

CHAS. J. WILEY.

Witnesses:
GEO. T. PINCKNEY,
CHAS. H. SMITH.